United States Patent Office 3,436,212
Patented Apr. 1, 1969

3,436,212
FLUX FOR TREATING ALUMINUM
Paul D. Hess, Lower Burrell, Pa., assignor to Aluminum Company of America, Pittsburgh, Pa., a corporation of Pennsylvania
No Drawing. Filed Nov. 22, 1966, Ser. No. 596,084
Int. Cl. C22b 21/06, 9/10, 9/12
U.S. Cl. 75—68                        7 Claims This invention relates to the flux treatment of molten aluminum. More particularly, the invention concerns an improved flux and its use in the treatment of a body of molten aluminum having a layer of dross on its surface. As generally used herein, the expression "aluminum" refers to aluminum or any grade or alloy thereof containing predominantly elemental aluminum.

The surface of a body of molten aluminum acquires a layer of oxide or oxides and other non-metallic impurities associated with the aluminum, which layer is commonly referred to as dross. This dross has to be skimmed from the metal surface prior to casting in order to avoid contamination of the metal cast. Also, as the layer of dross forms, particles of the molten aluminum are entrapped therein. Removing the dross in an aluminum enriched condition results in an excessive melt loss. Various fluxes have been used in treating dross covered molten aluminum to effect separation of the entrapped molten metal from the dross prior to removal of the dross. However, it has been found that the conventional fluxes often conrtibute contaminants to the melt, which contaminants have an adverse affect on the subseqent working of the metal cast from such melts. In addition, the amount of entrapped metal remaining in the dross after treatment with the conventional fluxes is excessive.

Accordingly, an object of the invention is to provide an improved flux for treating a molten body of aluminum having a layer of dross on its surface which reduces melt loss and which does not introduce contaminants into the molten metal.

A still further object of the invention is to provide an improved method of treating a molten body of aluminum having a layer of dross on its surface.

Other objects and advantages of the invention will become apparent to those skilled in the art from the following description of the invention.

In general, the flux composition of the present invention consists essentially of 30 to 90 percent by weight of potassium fluoride, and 5 to 40 percent by weight of aluminum fluoride, and 5 to 40 percent by weight of potassium fluosilicate. A preferred flux composition contains 60 to 80 percent by weight of potassium chloride, 15 to 25 percent by weight of aluminum fluoride, and 5 to 15 percent by weight of potassium fluosilicate.

The flux of the present invention is prepared by simply mixing the desired amount of each of the flux constituents. Since each flux constituent is generally in the form of a fine powder or crystal, this is readily accomplished with conventional blenders. The flux has been found particularly useful in the temperature range of 1250° to 1500° F. which embraces the temperatures generally employed in treating aluminum melts.

The invention provides a method of treating a molten body of aluminum or aluminum alloy covered by a layer of dross which comprises applying the described flux composition to the surface of the dross layer, maintaining the flux in contact with the layer of dross for a sufficient time to permit molten metal entrapped in the dross to separate and re-enter the melt, and subsequently removing the remaining aluminum depleted dross.

Usually one to ten pounds of the flux is required for every one thousand pounds of melt. However, the exact amount required depends on the surface area to be treated, and the melt charge. For example, if the melt charge consists mostly of scrap metal chips, such as those produced in scalping ingot surfaces and containing large amounts of non-metallic impurities, more flux would be required than if a less contaminated variety, such as ingot chunks, were employed.

One method of applying the flux to the surface of the dross is by simply pouring the desired amount of flux onto the dross. However, this might result in only localized areas thereof being adequately treated. To assure a more effective separation of the metal entrapped in the dross, the flux should be uniformly distributed onto the surface of the dross. This is readily accomplished with the use of a conventional screen basket sprinkler, powder sprayer, or other such suitable means. After the flux is so applied, it is preferable to work or otherwise stir the flux into the dross so that the flux will be distributed downwardly throughout the layer of dross and into contact with the upper surface of the molten body. Working or stirring thus assures a more effective contact of the flux throughout the dross being treated. Causing the flux to contact the upper surface of the molten body has the added advantage of preventing further molten metal entrapment in the dross. The working or stirring may be accomplished by the use of a puddling tool or other suitable means capable of effectively disturbing or cutting the layer of dross. Subsequent to the working or stirring operation which may require a few minutes, the flux is maintained in contact with the layer of dross for about 5 to about 30 minutes. During this latter period it is advantageous to increase the temperature of the dross layer as by application of heat thereto so that the separation of the molten metal globules from the dross is more rapidly and efficiently achieved. Then the remaining dross covering the molten body is removed with a skimming tool.

The following examples are illustrative of the invention.

Example 1

A reverberatory furnace was charged with 700 pounds of ingot scrap in rather large pieces of 5082 aluminum alloy, containing nominally 4.5% magnesium. After this was molten, 300 pounds of dry ingot scalpings of the same alloy in the form of small bits and pieces were charged. After the entire charge was in the molten state and was covered with a layer of dross, four pounds of flux containing 40 percent by weight potassium chloride, 30 percent by weight aluminum fluoride, and 30 percent by weight of potassium fluosilicate was applied to the surface of the dross with a screen basket sprinkler. The flux was worked into the dross for 2 minutes with a puddling tool. During the flux application and working operations, the temperature of the melt was maintained at 1350° F. The flux was maintained in contact with the dross layer for 15 minutes during which time the temperature of the melt was increased by the application of heat to the dross layer to 1380° F. Subsequently, the dross remaining on the surface of the melt was removed.

The melt loss was determined at 8.4 percent of the total 1000 pound charge. The melt loss of the same material treated in exactly the same manner without the addition of a flux was 15.5%.

Example 2

Example 1 was repeated except that the flux composition contained 70 percent by weight potassium chloride, 20 percent by weight aluminum fluoride, and 10 percent by weight potassium fluosilicate.

The melt loss was determined at 7.2 percent of the total 1000 pound charge.

Example 3

A reverberatory furnace was charged with the one thousand pounds of ingot scrap in rather large pieces of 5086 aluminum alloy (nominally Al, 4.0 Mg, 0.45 Mn, 0.10 Cr). After the entire charge was in the molten stage and was covered with a layer of dross, two pounds of flux containing 73 percent by weight potassium chloride, 18 percent by weight aluminum fluoride, and 9 percent by weight of potassium fluosilicate was applied to the surface of the dross with a screen basket sprinkler. The flux was worked into the dross for about 2 minutes with a puddling tool. During the flux application and working operations, the temperature of the melt was maintained at 1350° F. The flux was maintained in contact with the dross layer for about 15 minutes, during which time the temperature of the melt was increased to 1380° F. by the application of heat to the dross layer using burners situated above the dross layer. Subsequently, the dross remaining on the surface of the melt was removed.

The melt loss was determined at 2.4 percent of the total one thousand pound charge.

Larger melts of this same alloy treated with the same flux composition were cast into large ingots by the continuous casting process. These ingots were then rolled to form sheet products which exhibited a substantial decrease in the surface defects normally associated with flux derived contaminants. For example, edge cracks were decreased from a depth of about one inch to about one-half inch, an improvement of 50% over sheet identically produced except for the use of a prior art flux at the dross treating stage. It is apparent that the use of the improved flux composition results in substantial economy in a large or commercial metal production facility.

What is claimed is:

1. A flux composition useful for treating a molten body of aluminum, said flux composition consisting essentially of 30 to 90 percent potassium chloride, 5 to 40 percent aluminum fluoride, and 5 to 40 percent potassium fluosilicate.

2. A flux composition useful for treating a molten body of aluminum, said flux composition consisting essentially of 60 to 80 percent potassium chloride, 15 to 25 percent aluminum fluoride, and 5 to 15 percent potassium fluosilicate.

3. A flux composition useful for treating a molten body of aluminum, said flux composition consisting essentially of 73 percent potassium chloride, 18 percent aluminum fluoride, and 9 percent potassium fluosilicate.

4. A method of treating a molten body of aluminum having on its surface a layer of dross containing molten aluminum entrapped therein, comprising:

(a) applying a flux to the layer of dross, said flux consisting essentially of 30 to 90 percent potassium chloride, 5 to 40 percent aluminum fluoride, and 5 to 40 percent potassium fluosilicate, (b) maintaining said flux in contact with said layer of dross for about 5 to about 30 minutes to separate the entrapped molten aluminum from said dross, and (c) thereafter removing the aluminum depleted dross.

5. A method according to claim 4 wherein said flux consists essentially of 60 to 80 percent potassium chloride, 15 to 25 percent aluminum fluoride, and 5 to 15 percent potassium fluosilicate.

6. A method according to claim 4 wherein said flux consists essentially of 73 percent potassium chloride, 18 percent aluminum fluoride, and 9 percent potassium fluosilicate.

7. A method according to claim 4 wherein the flux is applied to the upper surface of said layer of dross and worked into said layer of dross to interdisperse said flux downwardly through said layer of dross and into contact with the upper surface of said molten body.

References Cited

UNITED STATES PATENTS

| | | | |
|---|---|---|---|
| 1,848,798 | 3/1932 | Pacz | 75—68 |
| 2,578,977 | 12/1951 | Lytle | 75—94 X |
| 2,848,321 | 8/1958 | Bunbury et al. | 75—94 |
| 3,305,351 | 2/1967 | Bylund | 75—68 |

FOREIGN PATENTS 380,577   9/1932   Great Britain.

L. DEWAYNE RUTLEDGE, *Primary Examiner.*

HENRY W. TARRING III, *Assistant Examiner.*

U.S. Cl. X.R.

75—94

U.S. DEPARTMENT OF COMMERCE
PATENT OFFICE
Washington, D.C. 20231

UNITED STATES PATENT OFFICE
CERTIFICATE OF CORRECTION

Patent No. 3,436,212                          April 1, 1969

Paul D. Hess

It is certified that error appears in the above identified patent and that said Letters Patent are hereby corrected as shown below:

Column 1, line 49, "fluoride" should read -- chloride --; same line 49, cancel "and".

Signed and sealed this 7th day of April 1970.

(SEAL)
Attest:

Edward M. Fletcher, Jr.                     WILLIAM E. SCHUYLER, JR.
Attesting Officer                             Commissioner of Patents